US012709376B2

(12) United States Patent
Kircher et al.

(10) Patent No.: US 12,709,376 B2
(45) Date of Patent: Aug. 18, 2026

(54) TRANSITION FOR A SIDEWALL TO A MONUMENT IN AN AIRCRAFT AND METHOD OF ADAPTING A SIDEWALL

(71) Applicant: Airbus Operations GmbH, Hamburg (DE)

(72) Inventors: Benedikt Kircher, Hamburg (DE); Dirk Humfeldt, Hamburg (DE); Thomas Hoffmeister, Hamburg (DE); Dirk Fritsche, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 18/660,996

(22) Filed: May 10, 2024

(65) Prior Publication Data

US 2024/0375761 A1 Nov. 14, 2024

(30) Foreign Application Priority Data

May 12, 2023 (EP) .................................... 23173004

(51) Int. Cl.
*B64C 1/06* (2006.01)

(52) U.S. Cl.
CPC .................................... *B64C 1/066* (2013.01)

(58) Field of Classification Search
CPC ........... B64C 1/066; B64C 1/00; B64D 11/04; B64D 2011/0046; B64D 11/00; B64F 5/10
See application file for complete search history.

(56) References Cited

U.S. PATENT DOCUMENTS

| | | | | |
|---|---|---|---|---|
| 4,050,208 | A * | 9/1977 | Pompei | B64C 1/066 244/119 |
| 5,222,694 | A * | 6/1993 | Smoot | B64C 1/40 244/119 |
| 2004/0188563 | A1* | 9/2004 | Guard | F16B 5/0064 244/118.1 |
| 2008/0282636 | A1 | 11/2008 | Roth | |
| 2010/0243801 | A1* | 9/2010 | Saint-Jalmes | B64D 11/0023 244/118.5 |
| 2015/0013265 | A1 | 1/2015 | Castanha et al. | |
| 2016/0258462 | A1* | 9/2016 | Lewis | F16B 21/075 |
| 2017/0043855 | A1 | 2/2017 | Malek et al. | |
| 2019/0127069 | A1 | 5/2019 | Koschinski et al. | |

FOREIGN PATENT DOCUMENTS

| | | |
|---|---|---|
| CN | 201633920 U | 11/2010 |
| DE | 102017125299 A1 | 5/2019 |

OTHER PUBLICATIONS

European Search Report for corresponding European Patent Application No. 23173004.5 dated Oct. 31, 2023.

* cited by examiner

*Primary Examiner* — Joshua J Michener
*Assistant Examiner* — Cindi M Curry
(74) *Attorney, Agent, or Firm* — Greer, Burns & Crain, Ltd.

(57) ABSTRACT

A transition for a sidewall and a monument in an aircraft. The transition comprises a transition wall bridging a gap between the sidewall and the monument, a side fitting arranged at a side edge of the transition wall facing the sidewall, the side fitting being configured to overlap and/or mate the sidewall, and a mount attached to the transition wall and configured to be mounted to the monument.

13 Claims, 6 Drawing Sheets

TRANSITION FOR A SIDEWALL TO A MONUMENT IN AN AIRCRAFT AND METHOD OF ADAPTING A SIDEWALL

CROSS-REFERENCES TO RELATED APPLICATIONS

This application claims the benefit of European Patent Application Number 23 173 004.5 filed on May 12, 2023, the entire disclosure of which is incorporated herein by way of reference.

FIELD OF THE INVENTION

The present disclosure generally relates to a transition for a sidewall and a monument in an aircraft, an interior aircraft cabin assembly, and an aircraft having such transition and a method for adapting a sidewall. Particularly, the present disclosure relates to a transition having a side fitting at a side edge of a transition wall facing a sidewall, wherein the side fitting overlaps and/or mates the sidewall. Furthermore, the present disclosure relates to an interior aircraft cabin assembly, and an aircraft having such transition and a method of adapting a sidewall including providing such transition wall.

BACKGROUND OF THE INVENTION

Aircraft comprise a plurality of frames (a primary structure arranged in a cross-sectional plane of the aircraft) and a plurality of windows usually arranged between two frames. The frames and windows are usually arranged at regular intervals over the majority of the length of the aircraft. On an interior side, a sidewall is arranged that covers one or more frames and includes a corresponding number of window openings. Since the frames extent further into the interior space of the aircraft than the windows, the sidewall has different depths or radii (the depth corresponds to a viewing direction from the interior space to a window or two an exterior space of the aircraft). For example, at a frame the sidewall usually has its innermost part (depth=0), while the sidewall has its outermost part at the window (casing) (depth>0).

One or more monuments are usually placed in the interior space of the aircraft. The monuments have at least one wall arranged substantially perpendicular to the sidewall, i.e., arranged in a cross-sectional plane of the aircraft. The position of the monuments along a longitudinal direction of the aircraft depends on a cabin design, which may be independent from the regular intervals of frames and windows. Thus, in the majority of cases the monument (wall) will be arranged not at a frame and, hence, not at a longitudinal end of the sidewall.

Therefore, a gap between the sidewall and the monument (wall) is conventionally closed with a seal or edge guard provided on the monument wall. If the monument wall comes close to a window casing (depth>0), an exterior side of the monument wall is cut corresponding to the depths of the sidewall and the remaining gap is again filled with a seal or edge guard.

However, this usually leads to structures, which do not provide an appealing look. The at least one seal arranged on the sidewall and/or the monument makes it further difficult to have an aesthetic appearance.

SUMMARY OF THE INVENTION

It is therefore an object of the present disclosure to improve the intersecting area of a sidewall and a monument in an aircraft.

This object may be solved by the present invention as disclosed in one or more embodiments. Preferred embodiments are also disclosed herein.

According to a first aspect to better understand the present disclosure, a transition for a sidewall and a monument in an aircraft comprises a transition wall bridging a gap between the sidewall and the monument, a side fitting arranged at a side edge of the transition wall facing the sidewall, the side fitting being configured to overlap and/or mate the sidewall, and a mount attached to the transition wall and configured to be mounted to the monument.

The monument can be a galley, a lavatory, a closet, a partition wall, a bulkhead, or any other interior cabin component installed close to the sidewall.

Thus, a seal or elastic gap filler between the sidewall and the monument wall can be omitted, which sometimes gets loose or is pulled out by passengers. Furthermore, a standardized transition between the sidewall and the monument can be achieved throughout the aircraft and/or a fleet of aircraft. This improves the overall look and feel for passengers.

In an implementation variant, the transition can further comprise a sidewall interface configured to be mounted to a side edge of the sidewall. Such a sidewall interface provides a regular edge or standardized side edge for the sidewall. Particularly, the sidewall interface can be made to better match and correspond to the side fitting arranged at the side edge of the transition wall. The sidewall interface and side fitting can, hence, mate and can be coupled to one another in a formfitting and/or force fitting manner. In case the transition wall and the sidewall are adhered to one another, the sidewall interface facilitates such connection.

In another implementation variant, the transition can further comprise a seal arranged between the transition wall and the monument. This allows certain tolerances to be applied to the transition wall in the area near and/or overlapping the monument. Compared to conventional seals, the seal arranged between the transition wall and the monument is hidden as the seal is not on top of the interior surface of the sidewall and the monument. In addition, air streams to and from behind the sidewall are hindered by the seal, and items cannot fall behind the sidewall or the monument.

In yet another implementation variant, the transition can further comprise a compressible section arranged at an end or side of the transition wall. For instance, the compressible section can be arranged along an edge of the transition wall close to the monument. Thus, the transition wall provides a compressible portion at an end, which can function as an integrated seal. In other words, the compressible section can contact the monument and can close any gap therebetween. This allows omission of any seals separately placed into gaps, and, hence, avoids the problem of the seal becoming loose.

As a mere example, the compressible section can have a Shore hardness that indicates a softer section than the remainder of the transition wall, which is more rigid.

The compressible section can be formed of the same material as the remainder of the transition wall. For instance, the transition wall can form a rigid section, such as a full block of the material or a honeycomb sandwich plate, that is rigid and statically fixed in all dimensions. The compressible section, on the other hand, comprises geometric structures and/or voids and/or channels, so that the geometric structures can be compressed, bend or otherwise deflected.

In another implementation variant, the transition can further comprise a bracket mounted to the transition wall and holding the mount. Thus, a predefined location of the mount relative to the transition wall can be achieved. This further allows minimizing a gap between the transition wall and the monument or at least allows minimizing tolerances.

In a further implementation variant, the mount can be attached to an exterior surface of the transition wall facing away from an interior space of the aircraft, and wherein the mount can be configured to be mounted to an interior surface of the monument facing towards the interior space of the aircraft. The exterior surface of the transition wall faces an outer skin of the aircraft and, hence, is not visible when being installed in the aircraft. The interior surface of the monument relates to a surface that is visible from the interior space of the aircraft, when the monument is installed and when the transition is not yet installed. Such interior surface of the monument can be arranged arbitrarily, for example parallel to a cross-sectional direction of the aircraft.

This location of the mount allows the monument to be positioned as close to a primary structure of the aircraft as possible. For instance, such primary structure can be a frame or stringer, which is usually covered by the sidewall. Having the mount mounted to an interior surface of the monument provides for the transition wall to be likewise be placed in front of the monument, i.e., in front of and close to the interior surface of the monument. Thus, the transition wall covers a (small) portion of the monument, i.e., the exterior end of the monument, which allows the monument to be placed even at a position where usually a sidewall would be located.

Alternatively, the mount can be attached to an interior surface of the transition wall facing towards the interior space of the aircraft, and wherein the mount can be configured to be mounted to an exterior surface of the monument facing away from an interior space of the aircraft. The exterior surface of the monument relates to a side of the monument that faces the outer skin of the aircraft and, hence, is not visible from the interior space of the aircraft when the monument is installed in the aircraft. Thus, the mount and, optionally, a portion of the transition wall can be arranged behind the monument, i.e., between the monument and the outer skin of the aircraft.

This location of the mount can be employed, if there is enough space between the monument and a primary structure of the aircraft, such as a frame or stringer.

In an implementation variant, the transition wall can widen at a bottom section. This allows a stronger structure of the transition wall. In addition, the mounting of the transition wall to the sidewall can be improved due to side edges of the transition wall and the sidewall that are not only vertically arranged.

The widened transition wall further allows adaptation of the transition wall to the cabin arrangement. For instance, if the transition wall is close to a feet area of a passenger seat, the transition wall can be adapted, in order to provide a sufficiently large feet space for the passenger, who sits in front of the monument wall. In other words, the transition wall can have a different shape than a regular sidewall.

In a further implementation variant, the transition wall can be configured to at least partially replace a window casing of the sidewall. The window casing is the part of the sidewall that has an increasing depth (from the interior space of the aircraft towards the exterior). By replacing a portion of the window casing, a transition wall can be provided that requires less space in the longitudinal direction of the aircraft than the window casing. This allows placing the monument closer to the window, while accessibility to the window is still maintained.

For instance, in conventional solutions, if the monument would overlap with the window casing, the window is usually closed by a sidewall not having a window casing.

According to a second aspect to better understand the present disclosure, an aircraft comprises at least one transition, according to the first aspect or one of its variants or examples.

As a mere example, the aircraft can comprise such transition at each monument on each side of the aircraft.

According to a third aspect to better understand the present disclosure, a method for adapting a sidewall of an aircraft to a monument placed adjacent to the sidewall comprises preparing a transition wall to bridge a gap between the sidewall and the monument. Thus, instead of the usual seal or flexible gap filler, a transition wall is installed. Such transition wall can be made from a rigid material to have similar characteristics as the sidewall and/or the monument (wall).

The method further comprises providing a side fitting to a side edge of the transition wall facing the sidewall. The side fitting being configured to overlap and/or mate the sidewall. As a mere example, in a cross-section of the transition wall (taken along a line perpendicular to the side edges, such as a horizontal line) the side fitting may have an L-shape, U-shape or J-shape, a leg of which overlaps with the sidewall. Preferably, the overlapping portion (leg) of the side fitting is arranged at an exterior surface of the sidewall. Mating the sidewall means that the cross-section of the transition wall as well as the sidewall (taken along a line perpendicular to the side edges, such as a horizontal line) correspond to one another.

The method further comprises attaching a mount to the transition wall, connecting the side fitting to a side edge of the sidewall, and connecting the mount to the monument. Thus, the transition wall is mounted to the sidewall as well as the monument. This allows a more rigid and stable connection compared to the conventional seal or gap filler.

For instance, the side fitting and the sidewall can be connected to one another in a formfitting and/or force-fitting manner. Thus, the sidewall and the transition wall can be connected to one another without any gap therebetween. This improves the overall appearance of the sidewall and transition to the monument, particularly the aesthetic appearance of the cabin.

In an implementation variant, the method can further comprise mounting a sidewall interface to a side edge of the sidewall, wherein the sidewall interface has a form mating the side fitting of the transition wall. Said connecting the side fitting can then comprise connecting the side fitting to the sidewall interface. Such sidewall interface provides a predefined (or even standardized) interface for connecting the transition wall thereto.

For instance, the side fitting can be connected to the sidewall interface in an overlapping and formfitting (and/or force-fitting) manner. Thus, a rigid, stable and gap-free connection between sidewall and transition wall can be achieved.

In another implementation variant, said preparing the transition wall can comprise manufacturing the transition wall to correspond to the gap between the sidewall and the monument in an additive layer manufacturing (ALM) technique. Such ALM technique may involve a plastic material that is built layer by layer.

For instance, ALM allows manufacturing of a transition wall optimized for the cabin arrangement, for example, optimized for the (desired) position of the monument with respect to a window, a primary structure of the aircraft (such as a frame), the sidewall and other constraints in the aircraft cabin. Furthermore, ALM also allows manufacturing the side fitting as an integral part of the transition wall. In addition, other parts of the transition, such as the mount and/or a bracket can be integrally manufactured.

In yet another implementation variant, the method can further comprise cutting the sidewall, for example, from top to bottom of the sidewall. This forms part of the preparing the gap between the sidewall and the monument. Usually the sidewall is designed to cover one or more frames of the aircraft. In order to freely position a monument, cutting the sidewall allows positioning the monument without any restriction due to the sidewall. For instance, the monument can be placed closer to the frame.

When manufacturing the transition wall using ALM, the transition wall can be made specifically to the cutting-edge of the sidewall as well as the monument as it is positioned in the aircraft cabin, and with high precision.

In a further implementation variant, said cutting the sidewall can comprise cutting the sidewall along a cutting line running at least partially through a window casing. This at least partial removal of the window casing allows manufacturing a transition wall that replaces the window casing with a different geometry (a geometry deviating from the remaining window casings in the aircraft). Thus, the gap between the sidewall (actually the cutting-edge of the sidewall) and the monument can be closed by the transition wall, even if the monument overlaps (in longitudinal direction of the aircraft) with the previous location of the (removed) window casing.

In yet a further implementation variant, the method can further comprise determining the cutting line to have maximum portions of equal depth of the sidewall, wherein the depth of the sidewall corresponds to a level in a direction from an innermost surface of the sidewall to an outermost surface of the sidewall, e.g., at the window casing. In other words, the depth of the sidewall corresponds to a location of a sidewall position along a cross-sectional direction of the aircraft, such as a radial direction. For instance, if the sidewall at a frame defines the origin (depth=0), the depth of the sidewall may have a maximum at the window.

Providing the cutting line to have maximum portions of equal depth means, that along the cutting line the depth does not change for the maximum possible portions. Where a change of the depth is necessary, such as close to a window or close to a primary structure or the like, this change of depth should have the shortest possible length. The constraints for this shortest possible length are given, for example, by the window casing.

This cutting line allows to have a transition wall that can be short in longitudinal direction of the aircraft, which further allows placing the monument as close to the window as possible.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
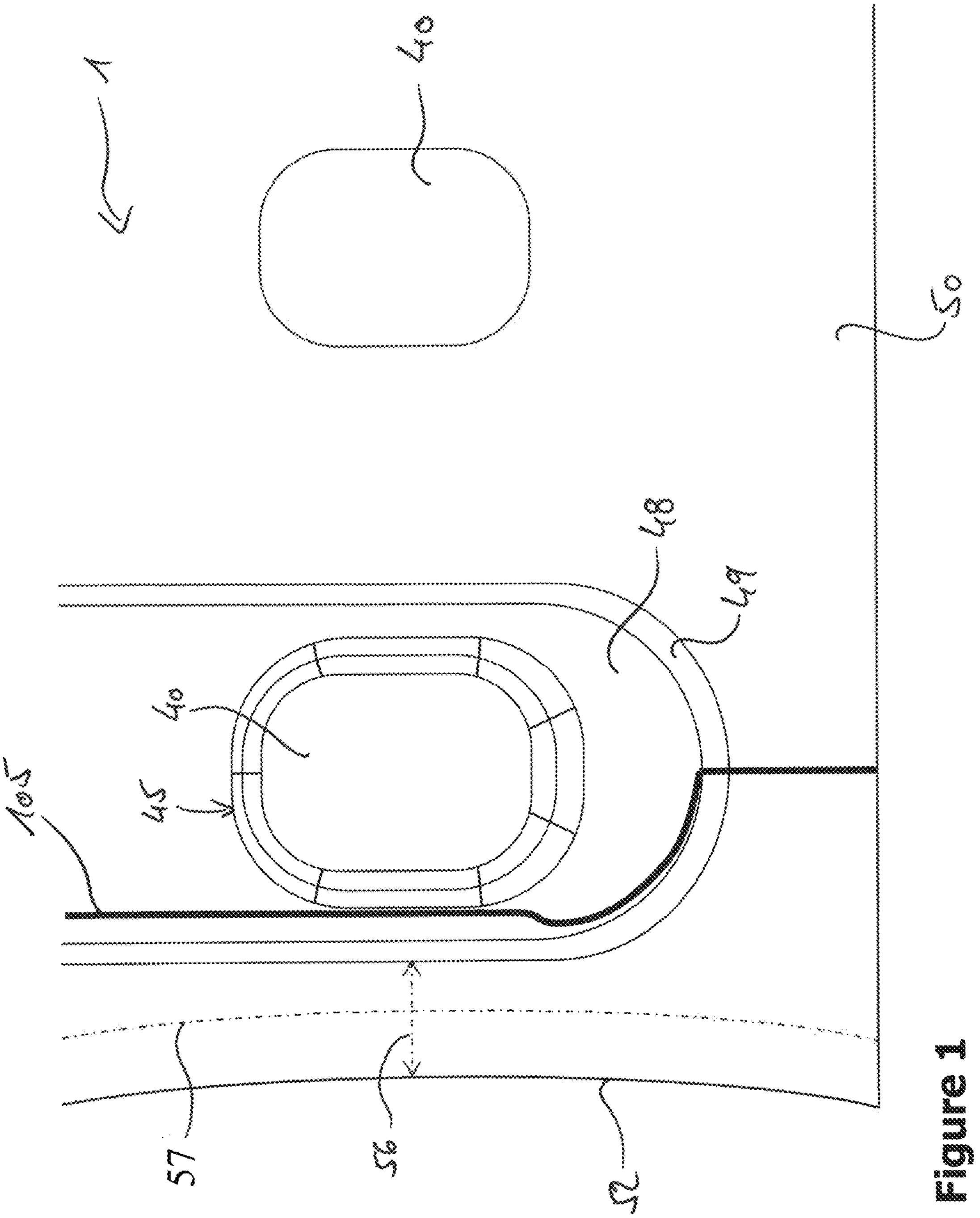
FIG. 1 schematically illustrates a portion of a sidewall and possible cutting lines.

FIG. 1 schematically illustrates a portion of a sidewall 50 and possible cutting lines 57, 105. The sidewall 50 forms an interior component of a cabin of an aircraft 1, particularly a component covering the primary structure of the aircraft 1 and forming a visible surface of the aircraft cabin. The sidewall 50 can comprise an opening for one or more windows 40. Only one of these windows is illustrated with a window casing 45, 48, 49 in FIG. 1.

For example, an edge 52 of the sidewall 50 may cover a frame 10 (FIG. 3), where the sidewall 50 can have its innermost portion. Innermost means closest to the center of an interior space of the aircraft 1. Usually, a frame 10 is the thickest component of the primary structure of the aircraft 1 (viewing in a cross-sectional or radial direction of the aircraft 1), so that the sidewall 50 has its innermost portion at the frame 10. On the other hand, the window 40 has a much smaller thickness compared to the frame 10. Thus, the sidewall 50 is located further away from the center of the interior space of the aircraft 1 close to the window 40 compared to the region of the frame 10.

In order to compensate this difference and maximize the interior space of the aircraft cabin, the sidewall 50 has areas with different depth and surface curvature. For example, a window casing is formed by different areas 45, 48, 49 of the sidewall 50. The first area 49 adjacent to the substantially flat sidewall 50 is the first area having an increasing depth (a first change of curvature). The second area 48 has a further increasing depth, yet with a less pronounced curvature (larger radii). The third area 45 surrounds the window 40 and is adjacent to the area 48. The third area 45 can have a greater steepness than the second area 48 or, alternatively, a smaller steepness than the second area 48, depending on the desired cabin design.

It is to be understood that the terms "flat" and "thickness" or "depth" of the sidewall 50 are contemplated with respect to the general curvature of the sidewall 50, which is schematically illustrated at the edge 52 in FIG. 1. In more detail, since the outer skin of the aircraft 1 has a curvature in a cross-section of the aircraft 1 (the aircraft substantially forms a cylinder) this curvature is also applied to the sidewall 50. For simplification, the portions of the sidewall 50 having the same radius are meant to be flat. The third area 45 has a greater depth (depth>0), as it is further away from the center of the interior space of the aircraft 1, i.e., has a greater radius.

FIG. 1 illustrates with a dash dotted line a conventional cutting line 57, where the sidewall 50 was cut, if the edge 52 was in the way when a monument (not illustrated) has to be placed next to the sidewall 50. As is indicated by the double arrow 56, the cutting line 57 was usually only placed somewhere between the edge 52 and the first area 49 of the window casing. This, however, significantly restricts the possibilities of positioning the monument in the aircraft cabin.

On the other hand, a further conventional method of positioning a monument was cutting the outermost edge of the monument according to the sidewall 50 in the area 56. This, however, led to a monument placed closer to the center of the interior space of the aircraft 1 or to a smaller monument.

In any case, using such conventional techniques, an elastic seal or gap filler was provided between the monument and the edge 52 or the sidewall 50.

According to the present disclosure a different transition between the sidewall 50 and monument is achieved.

A transition wall 110 (FIGS. 2 to 5) is placed at a gap between the sidewall 50 and the monument 200 (FIGS. 3 to 5), in order to bridge this gap. Since the monument 200 will most likely not be positioned at the edge 52 of the sidewall 50, a predefined gap is made first by cutting the sidewall 50. While such cutting may be along the cutting line 57 as illustrated in FIG. 1, the present disclosure allows to even cut the sidewall 50 up to the cutting line 105 running at least partially through the window casing 48, 49.

It is to be understood that the cutting line 105 could even run through the third area 45. However, this area 45 usually houses structures and mechanics used for the window 40 or blinds or the like, so that a cut through this area 45 may lead to other problems.

As illustrated in FIG. 1, the cutting line 105 runs along regions of the sidewall 50, where the cutting line 105 has maximum portions of equal depth of the sidewall 50. For instance, the upper portion of the cutting line 105 in FIG. 1 runs in the second area 48 close to the third area 45, so that a depth (radius) of the cutting line 105 will be the same over a long part of this upper portion of the cutting line 105. The same applies to the bottom portion of the cutting line 105 (straight bottom part of cutting line 105), where the "flat" region of the sidewall 50 below the window casing 45, 48, 49 is cut.

Between the upper and bottom portion of the cutting line 105, the cutting line 105 follows on substantially the same depth at the intersection between the first area 49 and the second area 48. Only a short portion of the cutting line 105 is then running through the second area 48. This short portion of the cutting line 105 has a greater steepness, i.e. a large increase of depth (radius) over a short length of the cutting line 105.

The gap between the sidewall 50 and the monument 200 made by such cut is closed by a bridging transition wall 110. The cutting line 105 allows providing a transition wall 110 having a maximum of flat portions, which simplifies the transition to the monument 200 as well as simplifies the connection to the sidewall 50.

Figure 2:
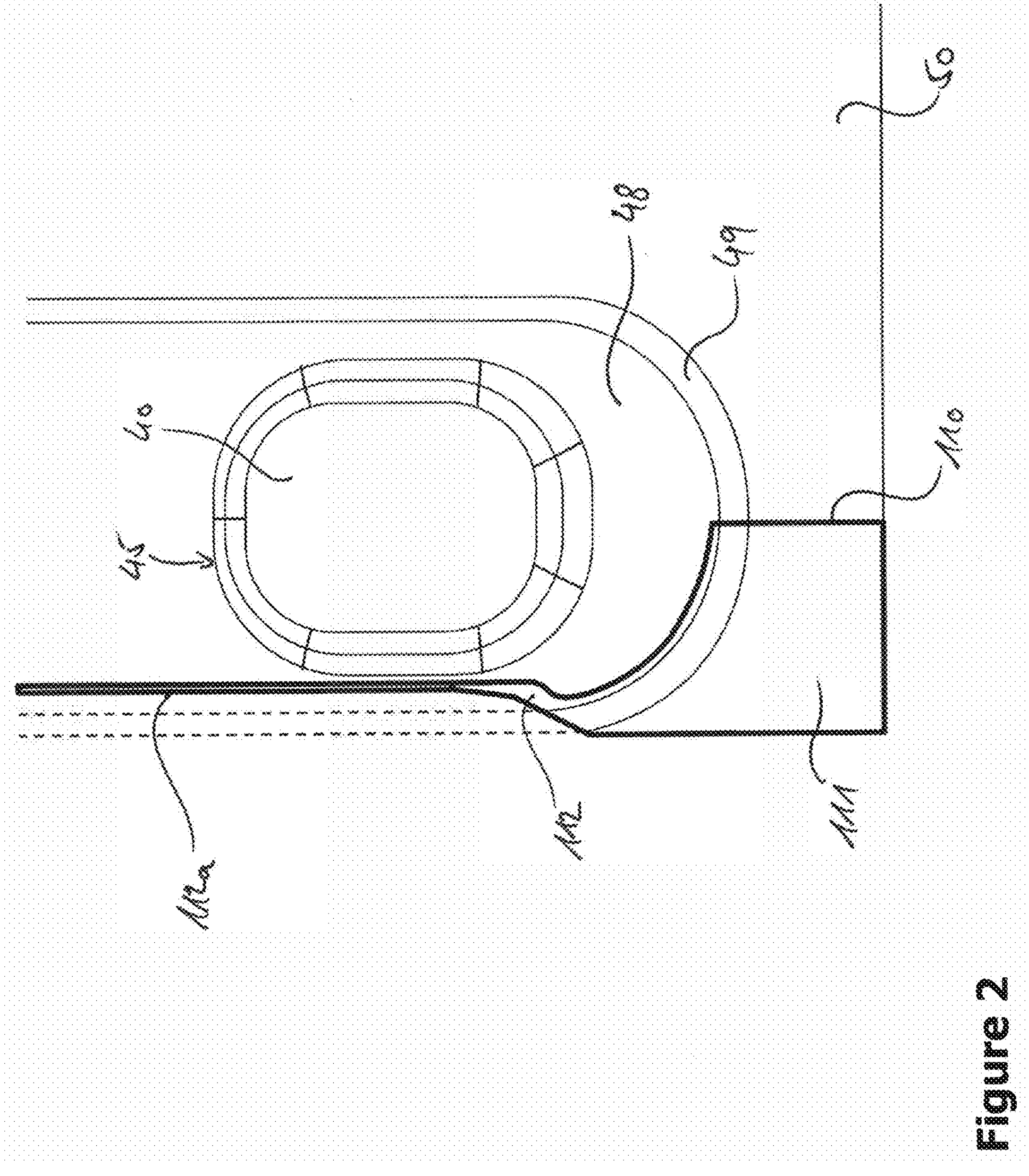
FIG. 2 schematically illustrates a portion of a sidewall near a window and an exemplary transition wall.

FIG. 2 schematically illustrates a portion of a sidewall 50 near a window and an exemplary transition wall 110. The left part of the sidewall 50 is cut away (e.g., along cutting line 105 of FIG. 1), schematically illustrated by dashed lines showing the previously present limits of first area 49 and second area 48. As can be derived from FIG. 2, the transition wall 110 can comprise a bottom portion 111 that has a side edge corresponding to the bottom portion of the cutting line 105. The upper portion 112 of the transition wall 110 can be formed to have a large steepness in only a small area, in order to compensate for the different depths. The transition wall 110 can optionally comprise a top portion 112*a*, which can be a thin transition wall arranged in the second area 48. Thus, to the left of the transition wall 110 a depth may be achieved over a long area (112, and 112*a*) corresponding to the innermost portion of the sidewall 50, a short portion of large steepness, and another area of continues depth at the bottom portion 111 between first area 49 and the bottom edge of the sidewall 50. This facilitates transitioning to the monument 200 with a substantially continuous radius. Thus, the monument 200 may be made with an exterior edge of a rather simple shape, due to the above-described form of the transition wall 110. Particularly, the exterior edge of the monument 200 can correspond to and/or follow the left edge of transition wall 110 in FIG. 2.

Figures 3A, 3B:
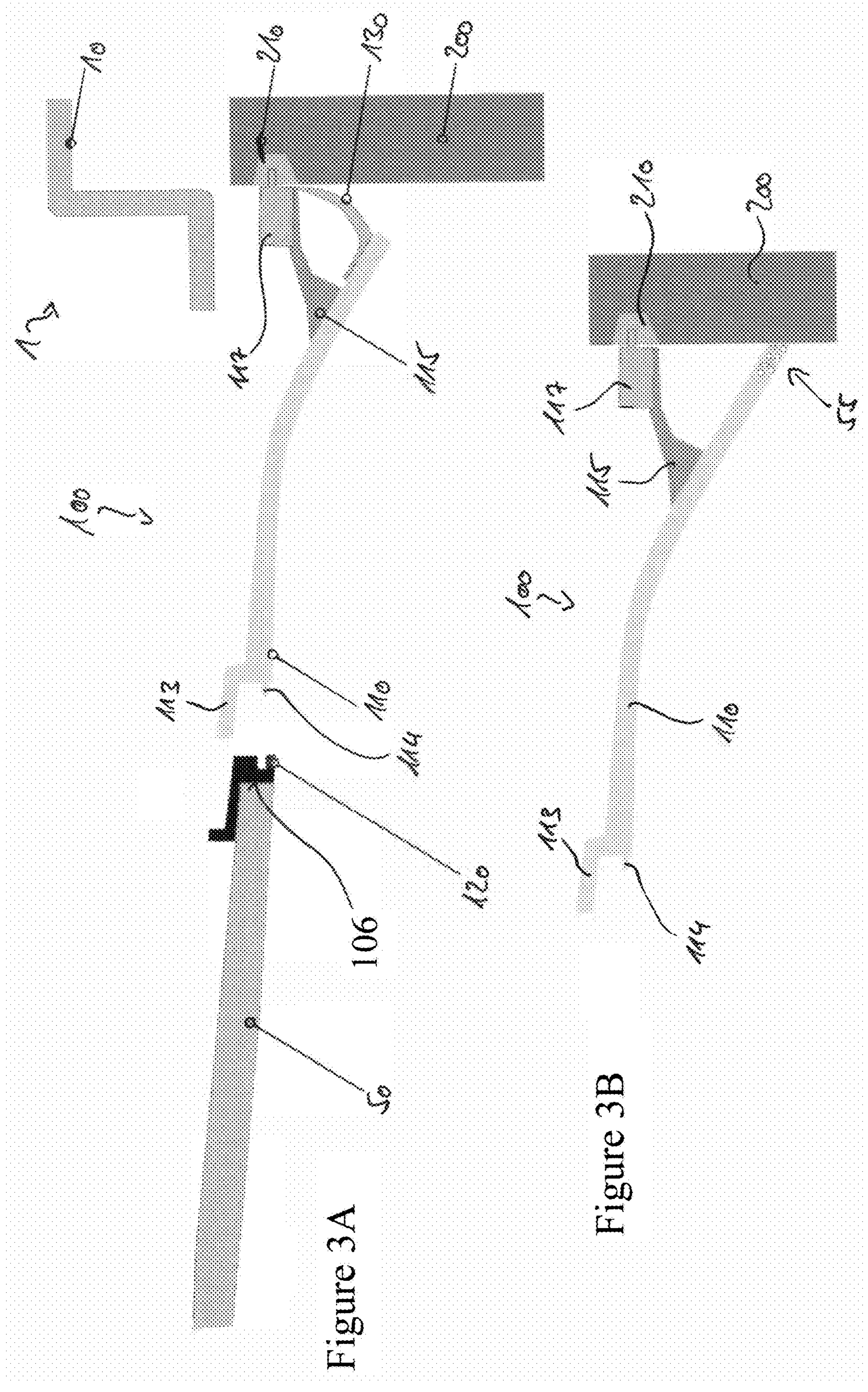
FIG. 3A schematically illustrates a cross-section of an exemplary transition wall.
FIG. 3B schematically illustrates a cross-section of another exemplary transition wall.

FIG. 3A schematically illustrates a cross-section of an exemplary transition wall 100. This cross-section is taken along a horizontal line. The transition wall 100 is provided with a side fitting 113 configured to overlap and/or mate the sidewall 50 and/or mate the side edge 52, 105 of the sidewall 50. As a mere example, a portion of the side fitting 113 is arranged, so that it is placed behind the sidewall 50, i.e. on an exterior surface of the sidewall 50. In addition, a protrusion 114 or similar element may be provided that increases formfitting and/or force-fitting capabilities between the side fitting 113 and the edge of the sidewall 50. This edge can be the regular edge 52 (FIG. 1) or can be a cut edge along cutting line 105. Since the cut edge along cutting line 105 leads to the "new" side edge, the same reference numeral 105 is used for the cutting line as well as the cut edge.

An optional sidewall interface 120 may be mounted to the side edge 106 of the sidewall 50. This sidewall interface 120 can be welded, adhered or otherwise fastened to the side edge 106 of the sidewall 50. An outer surface of the sidewall interface 120 corresponds to the side fitting 113 of the transition wall 110. Thus, standardized mating edges can be provided at the sidewall 50 and the transition wall 110. As a mere example, the sidewall interface 120 can comprise one or more recesses or a groove corresponding to the protrusion 114 of the side fitting 113.

It is to be understood that when cutting the sidewall 50 along the cutting line 105, the cut edge 106 can be prepared to provide the same functionality as the sidewall interface 120, particularly to mate the side fitting 113. This preparation can be performed, for example, if the material of the sidewall 50 allows it. As a mere example, the cut edge 106 of the sidewall 50 can be machined after cutting to mate the side fitting 113.

The side fitting 113 and the sidewall 50 or the sidewall interface 120 can be fastened to one another, for example by adhering, (thermal or ultrasonic) welding, or the like. Thus, the transition wall 110 forms an extension of the sidewall 50 in the direction of the monument 200 (particularly in the longitudinal direction of the aircraft 1). However, the transition wall 100 can be optimized for the gap between the sidewall 50 and the monument 200. Furthermore, the gap between the sidewall 50 and the monument 200 can be made to be optimized for such transition wall 100.

FIG. 3A illustrates a frame 10 of the primary structure of the aircraft 1, which usually forms a constraint for the positioning of the monument 200. As can be derived from FIG. 3A, the sidewall 50 would be arranged at its usual position, in front of the frame 10, the monument 200 is to be placed further into the interior space of the aircraft 1 (downwards in FIG. 3A).

This, however, can be avoided, by providing a mount 117 attached to the transition wall 110 and configured to be mounted to the monument 200. Specifically, the mount 117 can be attached to an exterior surface of the transition wall 110 (a surface of the transition wall 110 facing away from the interior space of the aircraft 1 and facing towards the primary structure 10 of the aircraft 1). In this case, the mount 117 is configured to be mounted to an interior surface of the monument 200. This interior surface of the monument 200 faces towards the interior space of the aircraft 1. As a mere example, an insert 210 can be placed in the monument (wall) 200, which can be any common insert 210.

FIG. 3A further illustrates an option for the transition wall 110. Specifically, the transition wall 110 is curved, which allows the sidewall transition as if it would have been manufactured for the monument 200. Thus, an optical integration can be achieved.

In this case a bracket 115 may be provided on the exterior side of the transition wall 110. The bracket 115 can then be used to hold the mount 117.

Furthermore, in order to close the last gap between the transition wall 110 and the monument 200, and hence the sole gap between the sidewall 50 and the monument 200, a seal 130 can be arranged between the transition wall 110 and the monument 200. Such seal 130 may hinder an air stream passing to and from the space on the exterior side of the sidewall 50 and transition wall 110, and may further hinder items of falling into this exterior space.

FIG. 3B schematically illustrates an optional feature for the transition wall 110 at the end of the transition wall 110 opposite to the sidewall 50. Besides this optional feature, the remaining parts of the transitional wall 110 are the same as those in FIG. 3A, so that their explanations are omitted for sake of brevity.

In more detail, FIG. 3B illustrates a transitional wall 110 comprising a compressible section 55 at an end of the transition wall 110 facing the monument 200. The compressible section 55 and the remainder of the transition wall 110 form an integral body. Thus, from the outside the entire transition wall 110 can look the same, can have the same thickness (up-down direction in FIG. 3B), can be homogeneously of the same material, etc.

The compressible section 55 is only schematically illustrated as voids (bubbles) in the material of the sidewall 50. Around such voids can be geometric structures (not explicitly illustrated) that allow bending, clinking, compressing, etc., so that the end (edge) of the transitional wall 110 becomes compressible as well as flexible. This compressible section 55, hence, forms an integral seal in the transition wall 110, as the transition wall 110 as well as the monument 200 can move relative to one another, thereby deforming the compressible section 55, i.e. compressing and releasing the compressible section 55.

Figure 4:
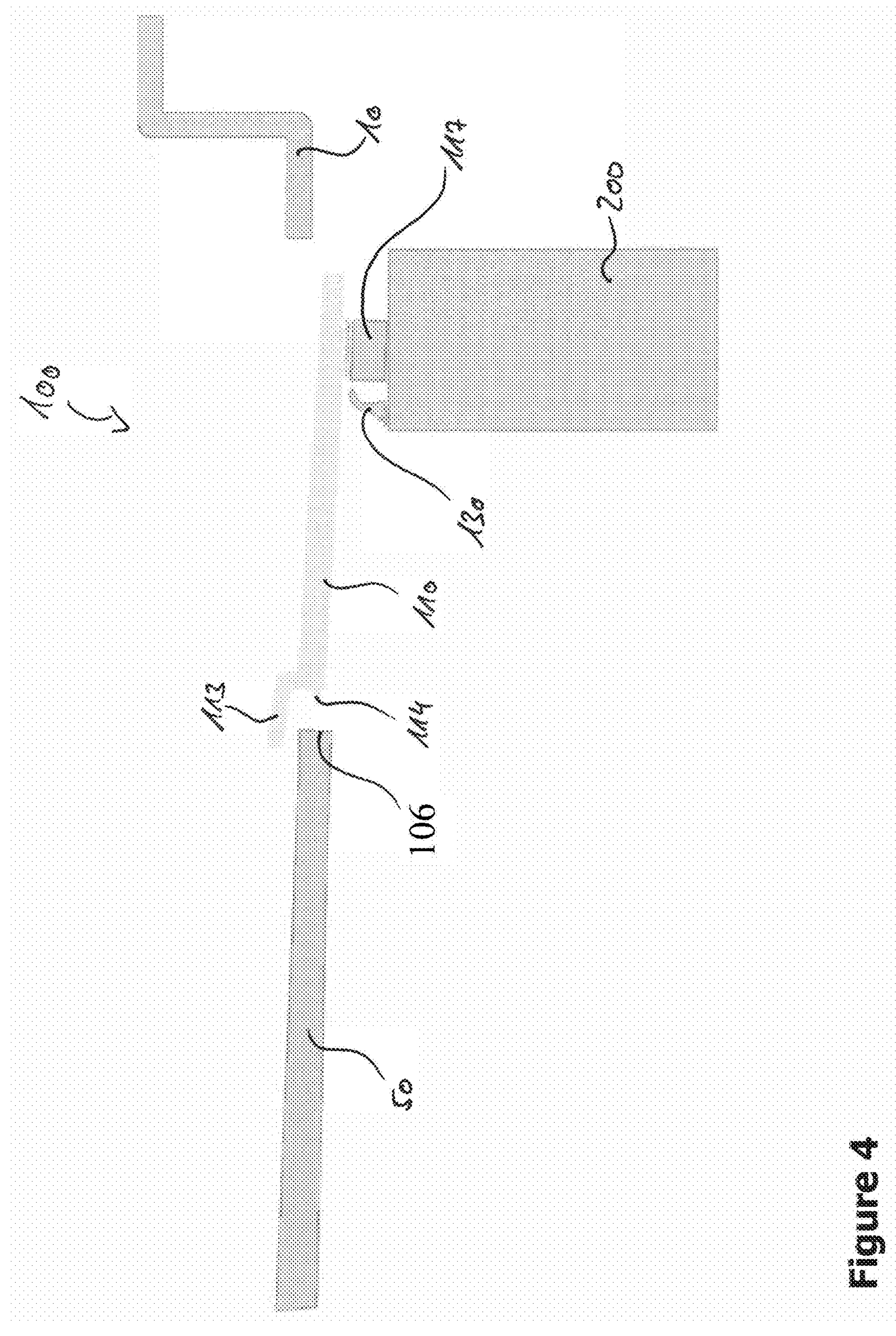
FIG. 4 schematically illustrates a cross-section of another exemplary transition wall.

FIG. 4 schematically illustrates a cross-section of another exemplary transition wall 110. In this example the monument 200 is arranged spaced apart from the frame 10 along a longitudinal direction of the aircraft (left right direction in FIG. 4). In this case, the transition wall 110 can be made rather flat or could even be bent towards the exterior side, i.e., towards the frame 10. Specifically, since the monument 200 covers the frame 10, it is sufficient that the transition wall 110 runs towards an exterior surface or side of the monument 200.

The mount 117 can then be attached to an interior surface of the transition wall 110, while the mount 117 is configured to be mounted to an exterior surface of the monument 200 facing away from the interior space of the aircraft 1. This configuration allows mounting the transition wall 110 very close to the exterior surface of the monument 200, and hence to the edge of the monument 200 between the exterior and the interior surfaces of the monument 200.

Furthermore, a seal 130 can be arranged between the transition wall 110 and the monument 200.

The attachment of the transition wall 110 to the sidewall 50 is achieved in the same manner as illustrated and described with respect to FIGS. 3A and 3B. FIG. 4 illustrates the option, where the connection between the side fitting 113 and the sidewall 50 is made without the sidewall interface 120 (FIGS. 3A and 3B). It is to be understood that the exemplary transition wall 110 of FIGS. 3A and 3B may likewise be attached to the sidewall 50 without the sidewall interface 120 as illustrated in FIG. 4.

Figure 5:
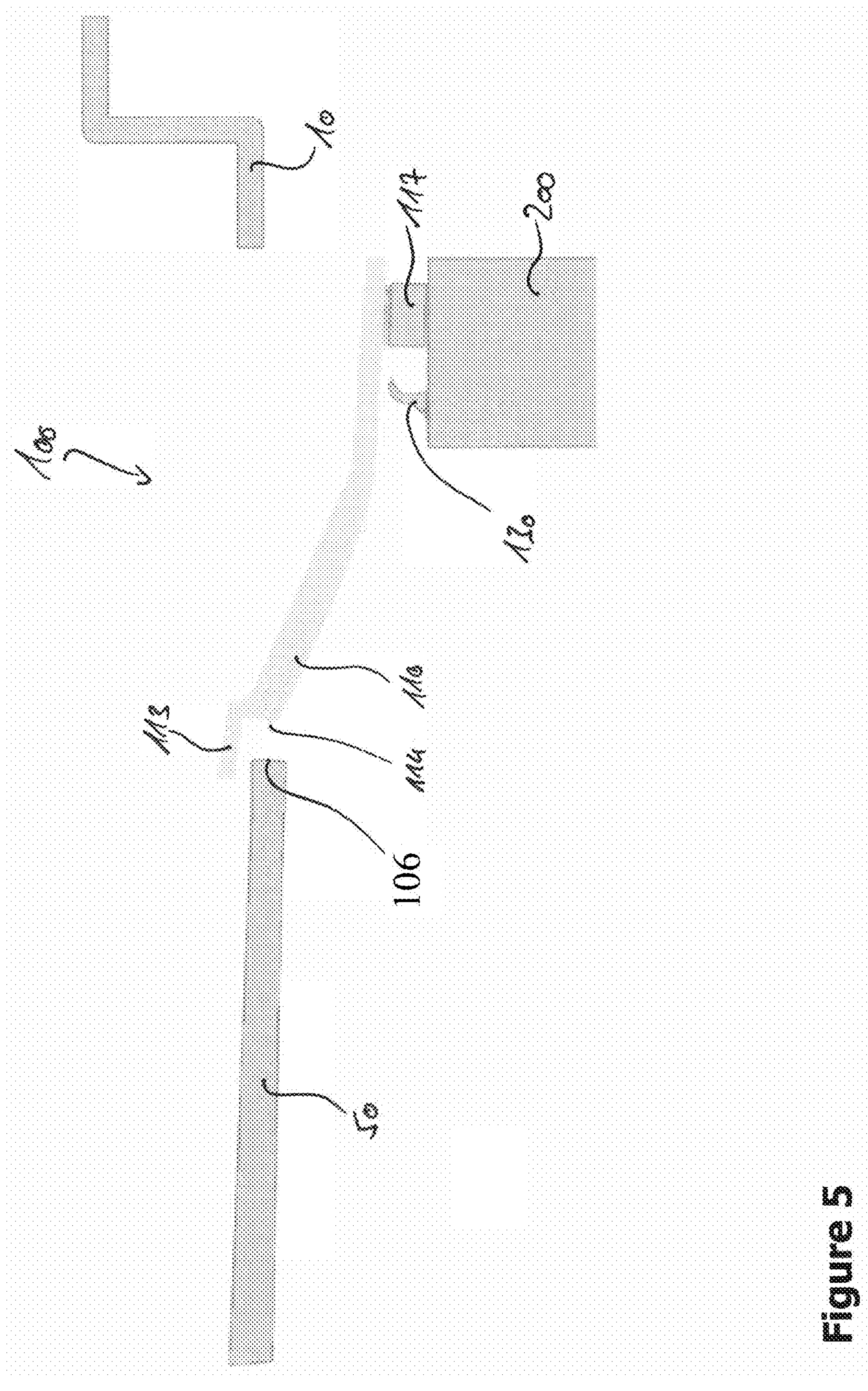
FIG. 5 schematically illustrates a cross-section of yet another exemplary transition wall.

FIG. 5 schematically illustrates a cross-section of yet another exemplary transition wall 110. This example is directed to a combination of the examples of FIGS. 3A, 3B, and 4. Specifically, the transition wall 110 is curved, and the mount 117 is attached to an interior surface of the transition wall 110 and mounted to an exterior surface of the monument 200. This exemplary transition wall 110 may be employed if the monument 200 is installed at a position spaced away from the frame 10. Thus, instead of providing an elastic seal or gap filler, the transition wall 110 is adapted to the situation between sidewall 50, frame 10 and monument 200.

The remaining details correspond to those illustrated and explained with respect to FIGS. 3A, 3B, and 4, so that they are not described for sake of brevity.

It is to be noted that some components of the transition are described using the singular form, such as the mount 117, the bracket 115 or the insert 210, since they are only visible ones in the cross-sectional illustrations of the drawings. It is to be understood that, of course, a plurality of such components can be employed.

Figure 6:
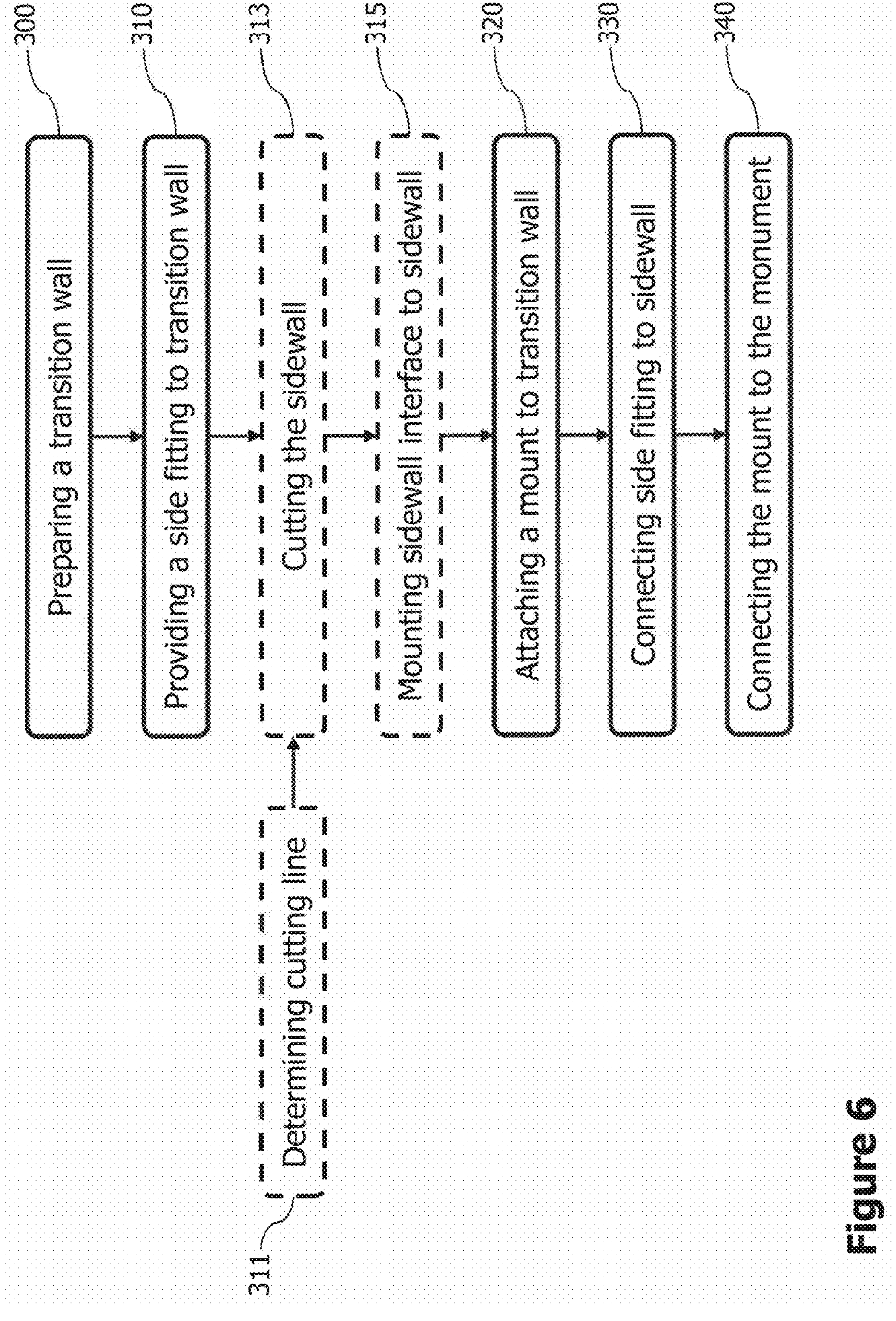
FIG. 6 illustrates a flow diagram of a method for adapting a sidewall to a monument.

FIG. 6 schematically illustrates a flow diagram of a method for adapting a sidewall 50 to a monument 200.

The method begins at step 300 with preparing a transition wall 110 to bridge a gap between the sidewall 50 and the monument 200. This may include manufacturing the transition wall 110 in an additive layer manufacturing (ALM) technique. This ALM allows manufacturing the transition wall 110 to correspond to the gap. For instance, any of the transition walls 110 illustrated in FIGS. 2 to 5 can be manufactured even during or after installation of the monument 200, i.e., when the gap between sidewall 50 and monument 200 is known.

In a further step 310, a side fitting 113 can be provided to a side edge of the transition wall 110 facing the sidewall 50. The side fitting 113 can be configured to overlap and/or mate the sidewall 50. If an ALM technique is applied, the side fitting 113 can be integrally formed with the remainder of the transition wall 110.

Some optional steps can be performed either before or after or concurrently with steps 300 and 310. These optional steps are illustrated with dashed lines in FIG. 6. For instance, in step 311 a cutting line 105 can be determined, i.e., a line 105, along which the sidewall 50 can be cut, in order to provide a predefined gap between the sidewall 50 and the monument 200.

Accordingly, in step 313, the sidewall 50 can be cut along the cutting line 105. The cutting may include sawing, laser cutting, waterjet cutting or the like.

An optional component for the transition can be provided, particularly a sidewall interface 120. In this case, in optional step 315, such sidewall interface 120 is mounted to a side edge 106 of the sidewall 50. The sidewall interface 120 has a form mating the side fitting 113 of the transition wall 110.

With or without these optional steps, the method can further comprise, in step 320, attaching a mount 117 to the transition wall 110.

Thereafter, in step 330, the side fitting 113 is connected to a side edge 52, 105 of the sidewall 50 (or to the optionally provided sidewall interface 120), and in step 340, the mount 117 is connected to the monument 200. Thus, the transition wall 110 forms a continuous component to the sidewall 50 and connects to the monument, so that a stable, appealing transition between sidewall 50 and monument 200 is achieved.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interior aircraft cabin assembly, comprising:

a sidewall configured to delimit an aircraft cabin and form a visible interior surface of the aircraft cabin, wherein the sidewall comprises a transverse side edge in relation to a longitudinal direction of the aircraft cabin; and a transition wall forming an extension of the sidewall and configured to bridge a gap between the sidewall and a monument, wherein the transition wall comprises:

a side fitting forming a transverse side edge of the transition wall, the transverse side edge of the transition wall facing the transverse side edge of the sidewall, the side fitting configured to overlap the sidewall and mate the transverse side edge of the sidewall, and a mount attached to the transition wall and configured to be mounted to the monument.

2. The interior aircraft cabin assembly of claim 1, further comprising:

a sidewall interface configured to be mounted to the transverse side edge of the sidewall.

3. The interior aircraft cabin assembly of claim 1, further comprising:

a seal arranged between the transition wall and the monument, or a bracket mounted to the transition wall and holding the mount, or both.

4. The interior aircraft cabin assembly of claim 1, wherein the mount is attached to an exterior surface of the transition wall facing away from an interior space of the aircraft, and wherein the mount is configured to be mounted to an interior surface of the monument facing towards the interior space of the aircraft, or wherein the mount is attached to an interior surface of the transition wall facing towards the interior space of the aircraft, and wherein the mount is configured to be mounted to an exterior surface of the monument facing away from an interior space of the aircraft.

5. The interior aircraft cabin assembly of claim 1, wherein the transition wall widens at a bottom section, or wherein the transition wall is configured to at least partially replace a window casing of the sidewall, or both.

6. An aircraft comprising:

the interior aircraft cabin assembly of claim 1.

7. A method for adapting a sidewall of an aircraft to a monument placed adjacent to the sidewall, the method comprising:

preparing a transition wall to bridge a gap between a sidewall and a monument;

providing a side fitting to a transverse side edge of the transition wall in relation to a longitudinal direction of the aircraft facing a transverse side edge of the sidewall, the side fitting being configured to overlap the sidewall and mate the transverse side edge of the sidewall;

attaching a mount to the transition wall;

connecting the side fitting to the transverse side edge of the sidewall, so that the transition wall forms an extension of the sidewall; and connecting the mount to the monument.

8. The method of claim 7, further comprising:

mounting a sidewall interface to the transverse side edge of the sidewall, wherein the sidewall interface has a form mating the side fitting of the transition wall, and, wherein connecting the side fitting comprises connecting the side fitting to the sidewall interface.

9. The method of claim 7, wherein connecting the side fitting comprises connecting in an overlapping and formfitting manner.

10. The method of claim 7, wherein preparing the transition wall comprises manufacturing the transition wall to correspond to the gap between the sidewall and the monument in an additive layer manufacturing technique.

11. The method of claim 7, further comprising:

cutting the sidewall from a top to a bottom of the sidewall to prepare the gap between the sidewall and the monument.

12. The method of claim 11, wherein cutting the sidewall comprises cutting the sidewall along a cutting line running at least partially through a window casing.

13. The method of claim 12, further comprising:

determining the cutting line to have maximum portions of equal depth of the sidewall, wherein a depth of the sidewall corresponds to a level in a direction from an innermost surface of the sidewall to an outermost surface of the sidewall at the window casing.

* * * * *